United States Patent [19]

Mafoti et al.

[11] Patent Number: 5,356,946
[45] Date of Patent: Oct. 18, 1994

[54] PROCESS FOR PREPARING REACTION INJECTION MOLDINGS

[75] Inventors: Robson M. Mafoti, Pittsburgh, Pa.; Josef Sanders, Leverkusen, Fed. Rep. of Germany; Robert P. Yeater, Moundsville, W. Va.

[73] Assignee: Miles Inc., Leverkusen, Fed. Rep. of Germany

[21] Appl. No.: 805,735

[22] Filed: Dec. 9, 1991

[51] Int. Cl.$^5$ .............................................. C08G 18/00
[52] U.S. Cl. ..................................... 521/163; 521/161; 521/137; 521/158; 528/45; 528/48; 528/52; 528/75
[58] Field of Search .............. 521/163, 161, 137, 158; 528/45, 48, 52, 75

[56] References Cited

U.S. PATENT DOCUMENTS

| | | | |
|---|---|---|---|
| 3,666,726 | 5/1972 | Grogler et al. | 528/26 |
| 3,691,112 | 9/1972 | Grogler et al. | 521/129 |
| 4,396,729 | 8/1983 | Dominquez et al. | 521/51 |
| 4,433,067 | 2/1984 | Rice et al. | 521/51 |
| 4,444,910 | 4/1984 | Rice et al. | 521/51 |
| 4,530,941 | 7/1985 | Turner et al. | 521/176 |
| 4,774,264 | 9/1988 | Weber et al. | 521/51 |
| 5,098,984 | 3/1992 | Mafoti | 528/44 |

*Primary Examiner*—John Kight, III
*Assistant Examiner*—Doc Truong
*Attorney, Agent, or Firm*—Joseph C. Gil; Godfried R. Akorli; N. Denise Brown

[57] ABSTRACT

Disclosed herein is a process for the preparation of a reaction injection molded elastomer comprising injecting a reaction mixture into a closed mold via a RIM machine, with the ratio of components being such that the isocyanate index is from about 70 to about 130, said reaction mixture comprising (a) an organic di- and/or polyisocyanate, (b) an amine terminated chain extender, and (c) a compound which is derived from the reaction of a polyfunctional acetoacetic acid ester and an aliphatic amine having amino groups of different reactivity.

1 Claim, No Drawings

PROCESS FOR PREPARING REACTION INJECTION MOLDINGS

BACKGROUND OF THE INVENTION

1. Field of Invention

The present invention relates to a process for preparing reaction injection moldings containing polyurea materials. More specifically the present reaction relates to the use of specified isocyanate reactive materials in the preparation of the reaction injection moldings.

2. Brief Description of the Prior Art

Reaction injection molded (RIM) materials are well known in the art and have met with substantial commercial success. U.S. Pat. No. 4,218,543 describes the use of relatively high molecular weight hydroxyl group containing materials, aromatic diamines as chain extenders, and isocyanates for the production of RIM parts.

More recently, the activity in the art has been towards the production of polyurea RIM parts. Typically, these parts are made from relatively high molecular weight polyethers which contain amine groups, diamine chain extenders, and isocyanates. Typical of the materials used and the technologies known in the art are those described in U.S. Pat. Nos. 4,396,729, 4,433,067, 4,444,910, 4,530,941, 4,774,263 and 4,774,264. As is known in the art, RIM parts are generally produced from two separate streams. One stream generally contains the isocyanate component, while the other stream contains the amine-containing polyether and the amine chain extender. Amine-containing polyethers (prepared by hydrolysis of isocyanate prepolymers) where the amine groups are attached to aromatic groups are generally too viscous for use in conventional RIM machinery, while amine-containing polyethers where the amine groups are attached to aliphatic moieties are too reactive to be used alone with conventional aromatic isocyanates.

Recently, the use of aminocrotonates in reaction injection molding applications has been discovered. See U.S. patent application Ser. No. 523,769, filed on May 15, 1990. In addition, U.S. patent application Ser. No. 524,268, filed on May 15, 1990, relates to production techniques for similar compounds which can contain aliphatic as well as aromatic bound amine groups. Similar compounds and their methods of production can be found in U.S. Pat. Nos. 3,666,726 and 3,691,112.

From the foregoing, it is clear that there is a continuing need for a suitable combination of polyamine and polyisocyanates which would constitute a RIM composition and process for preparing RIMs which has the desired processing and performance properties. The present invention provides such a process.

SUMMARY OF THE INVENTION

In accordance with the foregoing, the present invention encompasses a process for the preparation of a reaction injection molded elastomer comprising injecting a reaction mixture into a closed mold via a RIM machine, with the ratio of components being such that the isocyanate index is from about 70 to about 130, said reaction mixture comprising (a) an organic di- and/or polyisocyanate,
(b) an amine terminated chain extender, and
(c) a compound of the formula:

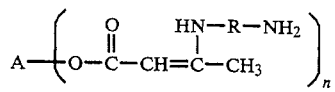

wherein A represents the polyfunctional radical left by the removal of the hydroxyl groups from a polyol having a functionality of n, R represents an aliphatic hydrocarbon radical, and n is an integer of from 2 to 6.

Typically compound (c) is a polyamine comprising a reaction product of a polyfunctional acetoacetic acid ester and an aliphatic amine having amino groups of different reactivity which is typically 1,5-diamino-2-methylpentane. It has been found that the process of this invention is attended by good processing, and reduced but desirable rate of reaction.

DETAILED DESCRIPTION OF THE INVENTION

Surprisingly, it has been found that, in comparison with other amines, there is a remarkable improvement in the processing and performance properties of polyurea reaction injection molding composition and materials which are based on component (c) polyamines. The component (c) polyamines can be prepared by reacting polyfunctional acetoacetic acid esters with aliphatic diamines of which 1,5-diamino-2-methylpentane is preferred. The reaction can be conducted in the presence or absence of a solvent and an acidic catalyst selected from the group consisting of (i) organic acids having pKa values of from about 0.1 to 0.8.

The polyfunctional acetoacetic acid esters useful herein are produced by techniques generally known in the art. For example, the acetoacetic acid esters may be produced according to the processes described in U.S. Pat. Nos. 3,666,726 and 3,691,112, the disclosures of which are herein incorporated by reference. In general, the acetoacetic acid esters can be produced by reacting polyols with diketenes, or by transesterifying alkyl acetoacetates with polyols. The transesterification technique is the presently preferred technique. In general, the transesterification reaction is conducted at temperatures ranging from 100° to 210° C. for periods of time ranging from 2 to 8 hours. If desired, transesterification catalysts, such as dibutyltin oxide and tetrabutyl titanate, can be used.

The polyols useful in producing the polyfunctional acetoacetic acid esters are of the type generally used in polyurethane chemistry. The polyols useful herein typically have molecular weights of from 62 to 12,000, preferably from about 800 to about 3500 and have hydroxyl functionalities of from 2 to 6, preferably from 2 to 4. Examples of suitable compounds include the polyesters, polyethers, polythioethers, polyacetals, polybutadienes and polycarbonates containing 2 to 6 hydroxyl groups of the type known for the production of polyurethanes. The polyethers suitable for use in accordance with the invention are known and may be obtained, for example, by polymerizing epoxides such as ethylene oxide, propylene oxide, butylene oxide, tetrahydrofuran, styrene oxide or epichlorohydrin in the presence of $BF_3$ or by chemically adding these epoxides, preferably ethylene oxide and propylene oxide, in admixture or successively to components containing reactive hydrogen atoms such as water, alcohols or amines. Examples of alcohols and amines include low molecular weight diols, triols and tetrols, 4,4'-dihydroxy diphenyl propane, sorbitol, aniline, ammonia, ethanolamine and ethylene diamine.

Suitable examples of polyesters include the reaction products of polyhydric, preferably dihydric alcohols (optionally in the presence of trihydric alcohols), with polyvalent, preferably divalent, carboxylic acids. Instead of using the free carboxylic acids, it is also possible to use the corresponding polycarboxylic acid anhydrides or corresponding polycarboxylic acid esters of lower alcohols or mixtures thereof for producing the polyesters. The polycarboxylic acids may be aliphatic, cycloaliphatic, aromatic, and/or heterocyclic and may be unsaturated or substituted, for example, by halogen atoms. The polycarboxylic acids and polyols used to prepare the polyesters are known and described for example in U.S. Pat. Nos. 4,098,731 and 3,726,952, herein incorporated by reference in their entirety. Suitable polythioethers, polyacetals, polycarbonates and other polyhydroxyl compounds are also disclosed in the above-identified U.S. Patents. Finally, representatives of the many and varied polyols which may be used in accordance with the invention may be found for example in High Polymers, Volume XVI, "Polyurethanes, Chemistry and Technology," by Saunders-Frisch, Interscience Publishers, New York, London, Vol. I, 1962, pages 32–42 and 44–54, and Volume II, 1964, pages 5–6 and 198–199; and in Kunststoff-Handbuch, Vol. VII, Vieweg-Hochtlen, Carl Hanser Verlag, Munich, 1966, pages 45–71.

Polyols useful herein also include materials which are typically used as chain extenders in polyurethane chemistry. Examples of such materials include ethylene glycol, 1,2- and 1,3-propanediol, 1,3- and 1,4- and 2,3-butanediol, 1,6-hexanediol, 1,10-decanediol, diethylene glycol, triethylene glycol, tetraethylene glycol, dipropylene glycol, tripropylene glycol, glycerol, trimethylol propane, and pentaerythritol.

The polyfunctional acetoacetic acid esters are preferably prepared by transesterifying any of the above noted polyols with lower alkyl acetoacetates. By "lower alkyl" is meant alkyl groups containing from one to five carbon atoms. Specific useful acetoacetates include methyl acetoacetate, ethyl acetoacetate, t-butyl acetoacetate, propyl acetoacetate and the like, with t-butyl acetoacetate being the presently preferred material. In preparing the acetoacetic acid esters herein, transesterification catalysts may be necessary. In preparing the polyfunctional acetoacetic acid esters, it is generally preferred that the reactants be used in amounts such that one OH group is present for each acetoacetate group. However, it is also possible to use excess amounts of either reactant. In fact, in some cases it is preferred to use an excess of the acetoacetate to ensure complete reaction. Also necessary is the use of less acetoacetate so as to leave unreacted hydroxyl groups which help in lowering viscosity.

In the preparation of the component (c) polyamine, the polyfunctional acetoacetic acid ester is reacted with a primary diamine in the presence or preferably in the absence of a solvent. The solvent, if used, can be the same type described in U.S. Pat. Nos. 3,666,726, and 3,691,112. Preferred solvents are those that form azeotropes with water. Suitable solvents include methylene chloride, chloroform, chlorobenzene, dichlorobenzenes, toluene, xylenes, ethylacetate, propylacetate, butylacetate, diethylether, dibutylether, and the like. Toluene is the presently used solvent. The amount of solvent is generally selected so as to be sufficient for dissolving the starting materials. In general, the solvent is used in a quantity of from 20 to 500, and preferably from 50 to 200 parts by weight per 100 parts by weight of the polyfunctional acetoacetic acid ester.

The catalyst, if used, is selected from the group consisting of boron trifluoride etherate and organic acids having pKa values of from 0.1 to 0.8. It has been found that use of catalysts having pKa values outside the range noted leads to side reactions which lead to solid products. In addition, only the catalysts noted lead to commercially acceptable yields. The amount of catalyst is generally selected so as to be sufficient to allow reasonable reaction times. In practice, the catalyst is added in amounts of from 0.05 to 2.0 mole %, and preferably from 0.3 to 1.0 mole %, based on the equivalents of acetoacetate present. This corresponds to from 0.01 to 0.2 % by weight, and preferably from 0.05 to 0.1% by weight based on the weight of the polyfunctional acetoacetic acid ester.

The amount of amine is generally selected so that one mole of amine is available for every acetoacetate equivalent. It is of course possible to react less than one mole diamine with one equivalent of acetoacetate. This might result in a lower conversion if the reaction is terminated before all acetoacetate groups have reacted with amine groups, or in chain extension if all acetoacetate groups have reacted. On the other hand, in order to suppress chain extension and to obtain low viscosity products, it might be advantageous to use more than one mole diamine per equivalent of acetoacetate. The unreacted diamine can either be stripped off once the reaction is complete, or can remain in the product to serve as a chain extender, i.e., in a reaction with isocyanates.

The reaction is generally carried out at temperatures of from 40° to 200° C., preferably from 60° to 120° C., under excess pressure, reduced pressure, or, preferably, in the substantial absence of pressure. The process can be conducted continuously or discontinuously. In general, the acetoacetic acid ester, the amines, and the catalyst are dissolved in the solvent, if it is employed. The reaction mixture is refluxed while the water of reaction is collected. When no more water comes off, the reaction is considered complete. The reaction time, of course, depends on the nature and the amounts of starting materials. In general, reaction times are between 1 and 6 hours. When the reaction is complete, the catalyst and any unreacted amine (if desired) are distilled off. The distillate can generally be recycled.

The isocyanate used in the process of the present invention is preferably an aromatic diisocyanate and/or polyisocyanate, i.e., a polyisocyanate in which all of the isocyanate groups are aromatically bound. Examples of such compounds include 2,4- and/or 2,6-diisocyanatotoluene; 2,2'-, 2,4'- and/or 4,4'-diisocyanatodiphenyl methane, mixtures of the last-mentioned isomers with their higher homologues (such as are obtained from the known reaction of the phosgenation of aniline/formaldehyde condensates); compounds containing urethane groups obtained as products of reaction of the above-mentioned di- and/or polyisocyanates with subequivalent quantities of polyhydroxyl compounds having molecular weights of from 62 to 10,000, (e.g., ethylene glycol, trimethylol propane, propylene glycol, dipropylene glycol or polypropylene glycols, and polyester glycols within the above-mentioned molecular weight range); di- and/or polyisocyanates modified by the partial carbodiimidization of the isocyanate groups of the above-mentioned di- and/or polyisocyanates; methyl-substituted diisocyanates of the diphenyl methane series or mixtures thereof (for example, those described in European Specification No. 0,024,665); or mixtures of such aromatic di- and polyisocyanates. Also useful are the so-called "modified" polyisocyanates. These modified isocyanates are generally known in the art and typically contain urethane, urea, carbodiimide, isocyanurate, allophanate, and/or biuret groups.

Included among the preferred isocyanates are the derivatives of 4,4'-diisocyanatodiphenyl methane which are liquid at room temperature. Specific examples of such compounds are polyisocyanates containing urethane groups obtainable according to German Patent 1,618,380 (U.S. Pat. No. 3,644,457) by reacting 1 mole of 4,4'-diisocyanatodiphenyl methane with from 0.05–0.3 mole of low molecular weight diols or triols, (preferably polypropylene glycols having molecular weights below 700); diisocyanates based on 4,4'-diisocyanatodiphenyl methane containing carbodiimide and/or uretoneimine groups, such as those disclosed in U.S. Pat. Nos. 3,152,162; 3,384,653 and 3,449,256, German Offenlegungsschrift No. 2,537,685 and European Specification No. 5233 (U.S. Ser. No. 903,308). Also included among the preferred polyisocyanates are the corresponding modified products based on mixtures of 2,4'- and 4,4'-diisocyanatodiphenyl methane or mixtures of the above-described modified 4,4'-diisocyanatodiphenylmethanes with minor quantities of higher than difunctional polyisocyanates of the diphenyl methane series. Such polyisocyanates are described in German Offenlegungsschrift 2,624,526. The preferred polyisocyanate mixtures of the diphenyl methane series are liquid at room temperature and have optionally been chemically modified as described above, with an average isocyanate functionality of from 2 to 2.8 (preferably from 2.1 to 2.7) containing 4,4'-diisocyanatodiphenyl methane as the main component (amounting to more than 40 wt. %).

As chain extenders, the diamines useful in the process of the present invention generally have molecular weights of from 108 to 400 and preferably contain exclusively aromatically bound primary or secondary (preferably primary) amino groups. Examples of such diamines are: 1,4-diaminobenzene, 2,4-diaminotoluene, 2,4- and/or 4,4'-diaminodiphenyl methane, 3,3'-dimethyl-4,4'-diaminodiphenyl methane, 4,4'-diaminodiphenylpropane-(2,2), mixtures of such diamines, and the like.

The preferred diamines have alkyl substituents in at least one position which is ortho to the amino groups. The most preferred diamines are those in which at least one alkyl substituent is present in the position ortho to the first amino group and two alkyl substituents are located in the position ortho to the second amino group, each alkyl substituent having 1 to 4 carbon atoms. It is particularly preferred to use such compounds in which an ethyl, n-propyl, isopropyl, t-butyl and/or methylthio substituent is present in at least one position ortho to the amino groups and possibly methyl substituents in other positions ortho to the amino groups.

Specific examples of preferred amines include 2,4-diaminomesitylene, 1,3,5-triethyl-2,4-diaminobenzene, 1,3,5-triisopropyl-2,4-diaminobenzene, 1-methyl-3,5-diethyl-2,4-diaminobenzene, 1-methyl-3,5-diethyl-diaminobenzene, 4,6-dimethyl-2-ethyl-1,3-diaminobenzene, 3,5,3',5'-tetraethyl-4,4'-diaminodiphenyl methane, 3,5,3', 5'-tetraisopropyl-4,4'-diaminodiphenyl methane, 3,5-diethyl-3,5'-diisopropyl-4,4-diaminodiphenyl methane, t-butyl toluenediamine and bis-thiomethyl toluene diamine. Also useful are adducts of these amines with epoxy resins. It is also within the scope of this invention to use aliphatic amine chain extender materials as described in U.S. Pat. Nos. 4,246,363, 4,269,945, 4,495,081 and 4,530,941, although the aliphatic amines are not preferred.

The above-mentioned diamines may, of course, also be used as mixtures. It is particularly preferred to use 1-methyl-3,5-diethyl-2,4-diamino-benzene or a mixture of this compound with 1-methyl-3,5-diethyl-2,6-diaminobenzene.

The diamine chain extending agent in the process of the present invention is preferably used in quantities of from 5 to 50 wt. %, most preferably from 10 to 40 wt. % (based on the weight of component c)).

Known mold release agents may be used to produce molded articles which have excellent mold release characteristics. Such internal mold release agents are among the auxiliary agents which may advantageously be used in the process of the present invention. In principle, any mold release agent known in the art may be used in the present invention but internal mold release agents such as those described, for example, in German Offenlegungsschrift No. 1,953,637 (U.S. Pat. No. 3,726,952), German Offenlegungsschrift 2,121,670 (British Patent 1,365,215), German Offenlegungsschrift 2,431,968 (U.S. Pat. No. 4,098,731), German Offenlegungsschrift 2,404,310 (U.S. Pat. No. 4,058,492) and U.S. Pat. Nos. 4,519,965 and 4,581,386 are preferred. Preferred mold release agents include the salts (containing at least 25 aliphatic carbon atoms) of fatty acids having at least 12 aliphatic carbon atoms and primary mono-, di- or polyamines containing two or more carbon atoms or amines containing amide or ester groups and having at least one primary, secondary or tertiary amino group; esters of mono- and/or polyfunctional carboxylic acids and polyfunctional alcohols containing saturated and/or unsaturated COOH and/or OH groups and having hydroxyl or acid numbers of at least five, ester type reaction products of ricinoleic acid and long chained fatty acids; salts of carboxylic acids and tertiary amines; and natural and/or synthetic oils, fats or waxes. Also preferred are the zinc salts described in U.S. Pat. Nos. 4,519,965 and 4,581,386.

The oleic acid or tall oil fatty acid salts of the amine containing amide groups which has been obtained by the reaction of N-dimethylaminopropylamine with oleic acid or tall oil fatty acid is particularly preferred.

Apart from the above-described preferred mold release agents, other mold release agents known in the art may in principle be used either alone or in a mixture with the preferred mold release agents. These additional mold release agents include, for example, the reaction products of fatty acid esters with polyisocyanates (according to German Offenlegungsschrift 2,319,648); the reaction products of polysiloxanes containing reactive hydrogen atoms with mono- and/or polyisocyanates (according to German Offenlegungsschrift 2,356,692 (U.S. Pat. No. 4,033,912); esters of mono- and/or polycarboxylic acids and polysiloxanes containing hydroxyl groups (according to German Offenlegungsschrift 2,363,452 (U.S. Pat. No. 4,024,090)); and salts of polysiloxanes containing amino groups and fatty acids (according to German Offenlegungsschrift 2,417,273 or German Offenlegungsschrift 2,431,968 (U.S. Pat. No. 4,098,731)).

If an internal mold release agent is used, it is generally used in an amount which totals from 0.1 to 25 wt. %, preferably 1 to 10 wt. % of the whole reaction mixture.

No catalyst is required for the reaction between isocyanate groups and isocyanate reactive groups of the components b) and c). However, catalysts known and commonly used in the production of polyurethane foams and microcellular elastomers are included in the group of auxiliary agents and additives appropriate to the present invention.

Suitable catalysts include tertiary amines such as triethylamine, tributylamine, N-methyl-morpholine, N-ethylmorpholine, N-cocomorpholine, N,N,N',N'-tetramethylethylene diamine, 1,4-diazabicyclo-(2,2,2)-octane, N-methyl-N'-dimethylaminoethyl piperazine, N,N-dimethylbenzylamine, bis-(N,N-diethylamino)-adipate, N,N-diethyl benzylamine, pentamethyl diethylene triamine, N,N-dimethylcyclohexylamine, N,N,N',N'-tetramethyl-1,3-butanediamine, 1,2-dimethylimidazole and 2-methylimidazole. 30. Organometallic catalysts may also be used in the practice of the present invention. Particularly useful organometallic catalysts include organic tin catalysts such as tin(II) salts of carboxylic acids (e.g., tin-(II)-acetate, tin-(II)-laurate) and the dialkyl tin salts of carboxylic acids (e.g., dibutyl-tin-diacetate, dibutyl-tin-dilaurate, dibutyl-tin-maleate or dioctyl-tin-diacetate) alone or in combination with tertiary amines. Other suitable catalysts and details concerning the action of these catalysts are given in Kunststoff Handbuch, Volume VII, published by Vieweg and Hochtlen, Carl Hanser Verlag, Munich 1966, e.g., on pages 96 to 102.

If a catalyst is used, quantities of about 0.001 to 10 wt. %, preferably 0.05 to 1 wt. % (based on component c)) are appropriate.

The products of the process of the present invention are preferably molded elastomeric articles. Blowing agents may be used to produce molded articles having a compact surface and a cellular interior. The blowing agents used may be water and/or readily volatile organic substances and/or dissolved inert gases.

Examples of suitable organic blowing agents include acetone; ethylacetate; methanol; ethanol; halogen-substituted alkanes such as methylene chloride, chloroform, ethylidene chloride, vinyl idene chloride, monofluorotrichloromethane, chlorodifluoromethane and dichlorofluoromethane; and butane, hexane, heptane or diethyl ether.

Nitrogen, air and carbon dioxide are examples of suitable inert gases.

The effect of a blowing agent may also be obtained by the addition of compounds which decompose at temperatures above room temperature to release gases, for example nitrogen. Azo compounds such as azoisobutyric acid nitrile are examples of such compounds. Other examples of blowing agents and details concerning the use of blowing agents may be found in Kunststoff Handbuch, Volume VII, published by Vieweg and Hochtlen, Carl Hanser Verlag, Munich 1966, e.g., on pages 108 and 109, 453 to 455 and 507 to 510.

In accordance with the present invention, surface active additives (emulsifiers and foam stabilizers) may also be used as reaction mixture components. Suitable emulsifiers include the sodium salts of ricinoleic sulfonates or of fatty acids or salts of fatty acids and amines (such as oleic acid diethylamine or stearic acid diethanolamine). Alkali metal or ammonium salts of sulfonic acids (e.g., of dodecyl benzene sulfonic acid or of dinaphthyl methane disulfonic acid) or of fatty acids such as ricinoleic acid or polymeric fatty acids may also be used as surface active additives.

If foam stabilizers are used, it is preferred that they be water soluble polyether siloxanes. These compounds are generally a copolymer of ethylene oxide and propylene oxide linked to a polydimethyl siloxane group. Foam stabilizers of this type are described in U.S. Pat. No. 2,764,565.

Other auxiliary agents and additives which may optionally be used in the process of the present invention include known cell regulators (such as paraffins or fatty alcohols or dimethyl polysiloxanes), known pigments, dyes and flame retarding agents (e.g., tris-chloroethyl phosphate and polyphosphate), stabilizers against aging and weathering, plasticizers, fungistatic and bacteriostatic substances, and fillers (such as barium sulfate, glass fibers, kieselguhr or whiting).

Other examples of suitable surface active additives and foam stabilizers, flame retardants, plasticizers, dyes, fillers and fungistatic and bacteriostatic substances and details concerning the use of mode of action of these additives may be found in Kunststoff Handbuch, Volume VII, published by Vieweg and Hochtlen, Carl Hanser Verlag, Munich 1966, e.g., on pages 103 to 113.

When carrying out the process of the present invention, the quantity of polyisocyanates (component a) should preferably be such that the isocyanate index is from 70 to 130, most preferably 90 to 110 in the reaction mixture.

The process of the present invention is carried out by the known reaction injection molding technique (RIM process). Two streams are generally employed in this molding technique. In the present invention, the polyisocyanate (component a) is the first reactant and the "polyamine component" (i.e., the mixture of component c), and the diamine component c), is the second reactant. If any auxiliary agents or additives are used, they are generally mixed with the "polyamine component". However, it may be advantageous, for example when using a mold release agent containing isocyanate groups, to incorporate the release agent with the reactant polyisocyanate (component a)) before the process of the present invention is carried out. It is possible in principle to use mix heads in which three or four separate components may be simultaneously introduced so that no preliminary mixing of the individual components is required. The quantity of reaction mixture introduced into the mold is generally calculated to produce molded articles having densities of from 0.8 to 1.4 g/cm$^3$, preferably from 0.9 to 12 g/cm$^3$. When mineral fillers are used, however, the molded articles may have densities above 1.2 g/cm$^3$. The articles may be removed from the mold after they have been left in there from 5 to 90 seconds, preferably from 20 to 60 seconds.

The reactant mixture is generally introduced into the mold at a starting temperature of from 10° to 60° C., preferably from 20° to 50° C. The temperature of the mold itself is generally from 40° to 100° C., preferably from 50° to 70° C.

The systems process very well primarily due to the relatively low viscosity of component c). Upon demold, the resultant product has excellent flex modulus and heat sag properties as well as excellent impact properties. In addition, when compared to systems based on known amine-containing polyethers where the amine groups are attached to aliphatic moieties, the systems of the present invention are significantly slower reacting.

This slower reactivity allows the complete filling of large complex molds typically used in the automotive industry. The flowability characteristics of RIM systems are generally determined using the servodyne activity method which was developed to measure the activity (or gel time) of very fast reacting RIM systems. The servodyne actually measures the increasing viscosity of a reacting system. Thus, the time is measured from when the mixing starts to the formation of a solid polymer. The time is an indication of how long a particular system will remain flowable. The systems of the present invention, when tested using the servodyne technique, are significantly slower reacting than typical aliphatic amine based systems (for example, of the type described in U.S. Pat. No. 4,396,729).

The molded articles obtainable by the process of the present invention are particularly suitable for the manufacture of flexible automobile bumpers or car body parts.

The invention is further illustrated but is not intended to be limited by the following examples in which all parts and percentages are by weight unless otherwise specified.

EXAMPLES

In the examples showing the production of the polyfunctional acetoacetic acid esters, the apparatus used consisted of (i) a vacuum jacketed distillation column with metal packing, (ii) a variable reflux ratio distilling head with a round bottom flask attached to receive alkanol and excess alkyl acetoacetate, (iii) a five liter three neck flask, and (iv) a thermoregulator and a heating mantle.

General Procedure

A five liter flask was charged with the polyol, and nitrogen was bubbled through the flask, and the temperature was raised to 130° C. t-butyl acetoacetate ("tBAA") was charged into an addition funnel and added to the flask dropwise. At the completion, the temperature was raised to 160° C. t-Butanol ("tB") was collected in the receiving flask. Once the t-butanol stopped coming off, vacuum was slowly applied to remove residual t-butanol and unreacted t-butyl acetoacetate. The amount of t-butanol collected was noted and the product was characterized by IR. The disappearance of the hydroxyl peak around 3500–3400 cm$^{-1}$ indicated the completion of the reaction. The average time for the acetoacetylation was two hours. The acetoacetylated products were produced using the amounts of materials noted in the following Table 1.

TABLE I

| Polyol | pbw Polyol | pbw T-BAA | pbw t-Butanol |
|---|---|---|---|
| A | 70.1 | 7.9 | 4.4 |
| B | 80 | 7.6 | 4.23 |
| C | 70.1 | 7.9 | 4.4 |
| D | 80 | 9.3 | 5.2 |

The component (c) compound was prepared as follows, by aminating the acetoacetylated polyol with amines in accordance with the invention.

A three neck flask was charged with the acetoacetylated product noted in Table 1 and Dytek A (1,5-diamino 2-methylpentane available from Dupont Chemicals). The reaction was stirred and nitrogen was bubbled through. The temperature was raised to 115°–120° C. The reaction sequence was monitored by the amount of water collected. Once water was no longer being collected, the Dean Stark Trap was replaced with a condenser and vacuum was applied to the system to ensure total removal of water. Table 2 lists parts by weight of the starting materials and the viscosities of the resultant product at 25° C.

TABLE 2

| Component (c) Compound | pbw Acetoacetylated Polyol | pbw Dytek-A | Viscosity at 25° C. in mPa.s |
|---|---|---|---|
| A-1 | 71 | 4.8 | 3,370 |
| B-1 | 81–36 | 4.52 | 7,390 |
| C-1 | 71 | 4.8 | 11,000 |
| D-1 | 82 | 5.7 | 9.620 |

GLOSSARY OF TERMS

A A acetoacetate.

M-3600 a polyoxypropylene glycol having a molecular weight of about 2000.

M-9182 an ethylene oxide tipped polyoxypropylene glycol having a molecular weight of about 4000 (87% PO, 13% EO).

M-3400 a polyoxypropylene triol from glycerine and propylene oxide having a molecular weight of about 3000.

T-5000 a polyoxypropylene triol from glycerine and propylene oxide having a molecular weight of about 5000.

M-TDA a mixture of toluene diamines comprising 19% by weight of the 2,6-isomer, 76% by weight of the 2,4-isomers with the balance being the 2,3- and 3,4-isomers.

DETDA (E-505) an 80:20 mixture of 1-methyl-3,5-diethyl-2,4- and 2,6-phenylene diamine.

M-4050 a propylene oxide/ethylene diamine adduct having an OH number of 630.

L-5304 a silicone surfactant available from Union Carbide.

IPDA isophoronediamine.

PACM 4,4-diaminodicyclohexyl-methane.

E-507 a commercially available release agent prepared by reacting of oleic acid, adipic acid and pentaerythritol; the ester has an acid number of less than 5 and an OH number of about 51.

M-1419 (Isocyanate) The isocyanate is made by reacting 40.4 parts of M-3600 polyol with 33.7 parts of 4,4'-diphenylmethane-diisocyanate (MDI), 16.7 parts of polymeric MDI (MR-5) with 57% total monomer of which 2.6% is 2,4'-MDI with % NCO of 32.6 and 9.2 parts of polymeric MDI (MRS-4) which has 66% total monomer of which 19% is 2,4' and 2.6% is 2,2'-MDI with total % NCO of 32.6. The final product has an NCO content of about 17.5%.

TABLE 3

| PHYSICAL PROPERTIES OF DYTEK A MATERIAL | | | | |
|---|---|---|---|---|
| Examples | 1 | 2 | 3 | 4 |
| (A-1) M-3600/AA/Dytek A | 61 | — | — | — |
| (B-1) M-9182/AA/Dytek A | — | 61 | — | — |
| (C-1) M-3400/AA/Dytek A | — | — | 61 | — |
| (D-1) T-5000/AA/Dytek A | — | — | — | 61 |
| DETDA | 30 | 30 | 30 | 30 |
| E-507 | 5.5 | 5.5 | 5.5 | 5.5 |
| M-4050 | 2.0 | 2.0 | 2.0 | 2.0 |
| Zn-Laurate | .75 | .75 | .75 | .75 |
| L-5304 | .75 | .75 | .75 | .75 |
| M-1419 (Isocyanate) | 104.9 | 99.1 | 104.9 | 100.8 |
| HDT | 108.5 | 121.9 | 104.7 | 120.4 |
| Flex. Mod. (psi) | 67380 | 63260 | 72500 | 65950 |

TABLE 3-continued

| PHYSICAL PROPERTIES OF DYTEK A MATERIAL | | | | |
|---|---|---|---|---|
| Examples | 1 | 2 | 3 | 4 |
| Elongation (%) | 114.3 | 138.2 | 95.96 | 113.3 |
| Tensile (psi) | 3492 | 3836 | 4046 | 3587 |
| *Energy | 37 | 36.9 | 27.3 | 31.2 |
| *Total Load | 839.2 | 841.7 | 807.6 | 750 |

*Impact at −30° C. Total Energy (ft.-lbs)
HDT — Heat Distortion temperature.

Before making the test panels, the flowability characteristics of the test systems was determined using the servodyne activity method. The servodyne is used to measure the time between mixing the reactive components and formation of a completely solid polymer. It is known that a system having a servodyne activity of about 1.5 seconds will provide excellent processing. In the systems illustrated in the following examples, the ideal servodyne activity ranged from about 2 to about 4 seconds.

TABLE 4

| SOLUTION SERVODYNE ACTIVITY | | | | | |
|---|---|---|---|---|---|
| Examples | 1 | 2 | 3 | 4 | 5 |
| M-3600-AA/IPDA* | 61 | — | — | — | — |
| M-3600-AA/PACM 20* | — | 61 | — | — | — |
| M-3600-AA/Dytek A | — | — | 61 | — | — |
| M-3600-AA/DETDA | — | — | — | 61 | — |
| M-3600-AA/M-TDA | — | — | — | — | 61 |
| E-505 | 30 | 30 | 30 | 30 | 30 |
| Zinc Laurate | .75 | .75 | .75 | .75 | .75 |
| M-4050 | 2 | 2 | 2 | 2 | 2 |
| E-507 | 5.5 | 5.5 | 5.5 | 5.5 | 5.5 |
| L-5304 | .75 | .75 | .75 | .75 | .75 |
| M-1419 (Isocyanate) | 103.9 | 104.2 | 104.7 | 103.4 | 104.2 |

TABLE 4-continued

| SOLUTION SERVODYNE ACTIVITY | | | | | |
|---|---|---|---|---|---|
| Examples | 1 | 2 | 3 | 4 | 5 |
| Time in Secs. | 35.2 | 43.1 | 40.5 | 135 | 105.5 |

*Viscosity is above 15,000 centipoises due to chain extension which is attributable to the same reactivity of the the amino groups whereas the viscosity of Dytek A based materials is about 2000 centipoises.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the preparation of a reaction injection molded elastomer comprising injecting a reaction mixture into a closed mold via a RIM machine, with the ratio of components being such that the isocyanate index is from about 70 to about 130, said reaction mixture comprising (a) an organic di- or/or polyisocyanate,
(b) an amine terminated chain extender, and
(c) a compound of the formula

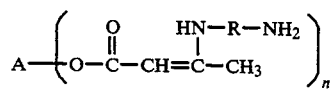

wherein A represents a polyfunctional radical left by the removal of the hydroxyl groups from a polyol of functionality n, R represents a aliphatic hydrocarbon radical, and n is an integer of from 2 to 6; wherein compound (c) is derived from the reaction of a polyfunctional acetoacetic acid ester and 1,5-diamino-2-methylpentane.

* * * * *